United States Patent [19]

Elbez et al.

[11] 4,376,003

[45] Mar. 8, 1983

[54] PROCESS FOR BONDING TOGETHER BOARDS OF WOOD WITH ROUGH OR SMOOTH SURFACE, OF SLICED OFF OR PEELED VENEER, PRODUCT USED FOR SAID BONDING AND FINAL MATERIAL OBTAINED

[75] Inventors: Gérard Elbez, Villeneuve Saint Georges; Jean de Leeuw, Paris, both of France

[73] Assignee: Centre Technique Du Bois, Paris, France

[21] Appl. No.: 264,998

[22] Filed: May 19, 1981

[30] Foreign Application Priority Data

May 20, 1980 [FR] France ................................. 80 11259

[51] Int. Cl.³ .......................... B32B 5/18; B32B 5/12
[52] U.S. Cl. ................................... 156/79; 156/307.3; 428/106; 428/317.5
[58] Field of Search .................. 428/106, 529, 317.5, 428/317.7; 156/79, 335, 307.3

[56] References Cited

U.S. PATENT DOCUMENTS

| | | | |
|---|---|---|---|
| 2,323,831 | 7/1943 | Menger et al. | 156/328 |
| 3,895,984 | 7/1975 | Cone et al. | 156/79 |
| 3,905,921 | 9/1975 | Cone et al. | 428/317.5 |
| 4,330,494 | 5/1982 | Iwata et al. | 156/79 |

*Primary Examiner*—William R. Dixon, Jr.
*Attorney, Agent, or Firm*—Martin LuKacher

[57] ABSTRACT

The present invention relates to a process for bonding together boards of wood with surface rough from sawing or with smooth surface, or sliced off or peeled veneers, wherein at least one of the surfaces to be brought into contact is coated with the aid of an expanding polymer glue containing at least one hardener
and at least one volatile pore-generating agent, the mating surfaces are brought into contact with possible application of a pressure and the whole is then heated up to a temperature at which the expansion of the glue has been provoked, up to a rate of expansion of between 30 and 100%. The invention also relates to the product used for said bonding and to the final material obtained.

8 Claims, No Drawings

PROCESS FOR BONDING TOGETHER BOARDS OF WOOD WITH ROUGH OR SMOOTH SURFACE, OF SLICED OFF OR PEELED VENEER, PRODUCT USED FOR SAID BONDING AND FINAL MATERIAL OBTAINED

The present invention relates to a novel process for bonding together boards or veneers of wood and to the products obtained due to this process.

The production of industrial materials by bonding boards of wood together is known; the conventional technique used firstly consists in subjecting the surfaces of boards to be bonded to a planing so as to obtain a sufficiently smooth surface, then in coating at least one of the surfaces with a suitable quantity of glue, in pressing the whole and in ensuring solidification of the glue. Now, the operation of planing the surface of the boards is a relatively expensive operation which, moreover, "consumes" a certain thickness of wood. It is an object of the present invention to overcome this difficulty by avoiding the operation of planing of the surfaces to be bonded together, when the boards are bonded, or limiting this operation to a local planing, or trimming.

Furthermore, it is known that appreciable pressures must be exerted during bonding when elements are made from sliced off or peeled veneers; to avoid a loss of thickness of the finished material when carrying out this technology, it is desirable to reduce the clamping pressure during the bonding operation. This is another object of the bonding technique according to the present invention.

The process of bonding according to the present invention is characterised in that:

at least one of the mating surfaces, which is in the rough or smooth state, of the boards or veneers to be bonded is coated with a polymer glue containing at least one hardening agent and at least one volatile pore-generating agent, the mating surfaces are brought into contact with application of pressure, and the whole is heated to a temperature provoking expansion of the polymer glue by volatilisation of the pore-generating agent.

Glues or adhesive products have already been used heretofore in the state of foam (for example phenol glues or urea formaldehyde or polyurethanes), but foaming of the glue was generally effected before application of said glue on the wood and was effected to reduce the quantity of glue to be used per square meter.

The use, as glues, has already been described of certain formophenolic resins containing aluminium chloride which, suitably heated, produce adhesive joints having the appearance of foam due to the gaseous emission resulting from the chemical reaction.

However, in these known bonding techniques, bonds having acceptable mechanical properties, particularly for stress-bearing uses, cannot be obtained due to the difficulty in controlling the conditions and rates of foaming. On the contrary, the process according to the invention makes it possible, due to a precise control of the rate of foaming and the conditions of foaming, to adapt the mechanical properties of the adhesive joint to the properties of the woods which are to be glued together. Moreover, in the process according to the invention, the expansion of the polymer glue taking place in situ, said expansion is adapted at each point to the local variations existing between the mating surfaces of the pieces to be bonded together; it follows that, although the expansion of the glue is homogeneous in a given "elementary cylinder" at each point of the surfaces of the pieces to be bonded together, this expansion is not the same for all these "elementary cylinders"; thus, parts necessarily appear, next to zones with very expanded glue, which have a sparingly expanded glue, thus having good mechanical properties.

"Rough surface" is understood to mean a surface as found when the boards have just been sawn. However, in addition to the local irregularities due to the attack of the wood by the saw teeth, the invention enables boards to be used whose general form is not absolutely flat. This possibility comes from the adaptation given by the expansion of the glue as the average rates of expansion which may be used are included substantially between 30 and 100%. This variable expansion rate will, moreover, be adaptable, all else being equal, to the properties of the wood to be bonded and to the weight per surface unit of glue necessary for ensuring a suitable bonding.

Expanding glue which may be used according to the invention can be any wood adhesive in which a pore-generating agent and a hardener have been included.

As base element (wood adhesive) of this expanding glue, the glues belonging to the following families may be cited:

melamine formaldehyde phenol formaldehyde (if necessary, these glues may be used without hardener)

resorcin formaldehyde resorcin phenol formaldehyde urea formaldehyde urea melamine formaldehyde vinyl emulsion with hardener As pore-generating agent which must be included in said wood adhesive, any product may be chosen which, under the effect of heat, will volatilise or decompose to form gaseous products; of course, the chosen pore-generating agent must be soluble or finely dispersable and compatible with the glue used. The most current pore-generating agents are the fluorinated derivatives of hydrocarbons such as methane or ethane; pure chemical products or mixtures (particularly mixtures producing azeotropes) of these products may be used. By suitably choosing the or each pore-generating agent, the temperature at which expansion of the glue will be effected may be determined.

The following may be mentioned, for example, as pore-generating agent:

trichlorofluoromethane trichlorotrifluoroethane tetrachlorodifluoroethane

The quantity of pore-generating agent to be used will depend on the desired degree of expansion and also on the wood adhesive chosen. As a general rule and to obtain good results, between about 4 and about 12 parts by weight with respect to 100 parts by weight of the glue ("glue" is understood to mean the dry polymer product present in the bonding liquid) should be used.

The glue according to the invention will also contain a hardening agent. This is a known product which will provoke setting and hardening (generally by cross-linking) of the glue.

Of course, the pore-generating agent, on the one hand, and the hardening agent, on the other hand, should be chosen so as to be adapted to each other as their action (foaming by vaporisation and hardening of the glue by cross-linking) should occur concurrently under the best conditions. The man skilled in the art will be able to choose these two types of products as a function of each other.

The expanding glue used in the invention may comprise other additives, including two which may play an important role for the success of the process. These two additives are: a gelling agent and a wetting agent. The gelling agent, when it is correctly chosen, may partially perform the function of wetting agent.

The addition of at least one gelling agent to the mixture which will comprise glue and a pore-generating agent has for its role to regularise the expansion of the glue due to the gelling of the mixture. For example, either cellulosic derivatives (derivatives of hydroxyethyl-cellulose used at a rate of 3 to 10 parts by weight, about, with respect to the glue) or polyvinyl alcohols (advantageously used at a rate of 0.5 to 2 parts by weight with respect to the glue), will be used as gelling agents.

The effect of the addition of wetting agent is to improve the contacts between the adhesive mixture and the surface of the wood; due to this agent, the force of adhesion of the glue on the wood is clearly improved; the quantity of wetting agent which may be used is advantageously of the order of 1 to 10 parts by weight with respect to 100 parts by weight of the glue. As wetting agent, a primary alcohol, a secondary alcohol or a glycol may for example be used. Heavy alcohols (benzylic or furfurylic alcohol) are products which have both properties of wetting agent and plasticizing properties. Mixtures of these alcohols may obviously be used.

As the glues are often marketed in the form of solution of the actual adhesive polymer product in an aqueous medium often containing an alcohol, the quantity of alcohol present must be taken into consideration when the quantity of wetting agent in the "glue" is calculated.

Of course, the expanding glues which may be used may also comprise other known additives among which mention may be made of inert or structural fillers, stabilisers, The expanding glue will be prepared by intimately mixing the various ingredients of the mixture.

Operation will preferably be carried out by successively admitting into a known mixer:
 the basic glue
 the gelling filler
 the pore-generating agent
 the wetting agent (if necessary)
then, possibly, the other additives (for example the hardener) provided. Mixing will be effected so as to obtain a homogeneous mixture obviously without provoking the expansion of the glue. This latter condition will sometimes necessitate that the mixer be cooled and the speed of mixing be controlled.

When the expanding glue has been prepared, it may be applied to the surface of the wood by any known means (sizing appliance with rollers, with curtain, extruding sizing appliance, spray gun . . . )

The quantity of glue to be used (weight of glue per square meter of surface to be sized) is, as has been seen, very variable. This quantity will depend on the wood and the "quality" of the surfaces to be glued. It has been observed that it was possible, for boards with rough surface from sawing but having only slight general "curvature", to glue by using the same quantity of expanding glue per square meter as that which is recommended for gluing these same boards after having planed them; the same applies to the bonding of veneers. However, the technician will understand that, by being able to control the rate of expansion of the expanding glue between about 30 and 100%, there is an important additional parameter allowing a satisfactory bonding to be made under the best economic conditions.

It is clear that the average thickness of the glue line and the weight per surface area of said glue constitute other parameters enabling adhesive bonds having suitable properties to be made. However, these parameters are known to technicians and may be optimally used by the specialists.

When the expanding glue has been deposited on the surface of the wood elements, assembly and pressing of the wood elements will be carried out according to known processes and with known apparatus, used for conventional bonding.

The temperature of the plane of bonding will then be subjected to a controlled rise so as to effect foaming of the glue. This operation may be effected immediately after pressing or within a certain period after this pressing (known period of time during which the expanding glue conserves a sufficient fluidity to be able to be further expanded). To effect this rise in temperature of the plane of bonding, any known means may be employed, such as:
 effect of heat conduction
 effect of convexion
 high frequency and hyperfrequency heating
 triggered exothermic reaction.

When the expansion of the glue has been effected, heating may be continued or stopped depending on the optimal temperature at which the glue must set.

The following non-limiting example illustrates the invention.

Elements of laminated timberwork composed of smooth boards of spruce fir (so that locally the interstice does not exceed 1 to 1.5 mm) are to be bonded with the aid of a glue based on resorcin.

The starting glue is composed of 100 g of resorcin phenol formaldehyde containing 60 g of dry matter. 5 g of trichlorofluoromethane, 2 g of methyl alcohol, 2 g of hydroxyethylcellulose and 20 g of hardener are added to this glue.

In place of the 2 g of methyl alcohol and the 2 g of hydroxyethylcellulose, 0.5 g of polyvinyl alcohol may advantageously be used.

The expanding glue thus prepared is spread on the surface to be bonded at a rate of about 550 g per square meter.

The boards to be bonded are pressed together and the whole is taken to a temperature (at the heart of the joint of expanding glue) of 25° to 30° C. The glue fills all the space between the boards due to an expansion which, locally, does not exceed 100% and may be small in the zones of thin joints.

Heating is continued at the same temperature so as to ensure rapid total setting of the glue.

It is obviously not possible to obtain a satisfactory bonding of the boards whatever the local or overall deformations of the surfaces to be bonded with respect to one another. The technician must therefore define, for a given wood, a given glue and a weight per surface area of adhesive mixture, the respective deformations of the surfaces which are admissible. In the case of spruce fir boards and a resorcin glue applied at a rate of a weight per surface area of 550 g/m$^2$ of adhesive mixture, the section of the surfaces of boards admissible is that for which the interstice between two boards in a section perpendicular to the grain of the wood responds to the following condition:

$$J' \geq 12.5$$

J' being defined by:

$$\sum_i \frac{li}{\sqrt{ei}}$$

in which li is the percentage of the width of joint of a thickness of a given class i and ei is the localised thickness of the joint in millimeters.

This is, of course, an approximate formula, useful for the technician.

What is claimed is:

1. A process for bonding non-matching wood surfaces together which comprises the steps of
    coating at least one of the non-matching surfaces with a polymer wood glue containing a hardener and a pore-generating agent,
    contacting said coated surface with the other surface to be joined and
    heating the assembly to a temperature to cause expansion of the pore-generating agent whereby from about 30 to 100% of expansion of the glue occurs.

2. The process of claim 1 wherein the step of contacting the non-matching surfaces is maintained under pressure.

3. The process of claim 1 wherein the pore-generating agent is present in an amount of from about 4 to about 12 parts by weight per 100 parts by weight of the dry matter of the glue.

4. The process of claim 1 or 3 wherein from about 0.5 to about 10 parts by weight of a gelling agent is present based on 100 parts by weight of the dry matter of the glue.

5. The process of claim 1 wherein from about 1 to about 10 parts by weight of a wetting agent is present per 100 parts of the dry matter of the glue.

6. The process of claim 1 wherein said glue has a composition which comprises a polymeric wood adhesive, a hardening agent and a volatile pore-generating agent.

7. The process of claim 6 wherein said polymeric wood adhesive is a polymer selected from the group consisting of melamine formaldehyde, resorcin formaldehyde, resorcin phenol formaldehyde, urea formaldehyde, urea melamine formaldehyde and vinyl emulsions.

8. The process of claim 6 wherein the volatile pore-generating agent is a fluorinated hydrocarbon.

* * * * *